United States Patent
Siddiq

(10) Patent No.: US 11,113,964 B1
(45) Date of Patent: Sep. 7, 2021

(54) UNMANNED AERIAL VEHICLE FOR TRAFFIC MANAGEMENT AND SURVEILLANCE

(71) Applicant: Khalil Siddiq, Houston, TX (US)

(72) Inventor: Khalil Siddiq, Houston, TX (US)

( * ) Notice: Subject to any disclaimer, the term of this patent is extended or adjusted under 35 U.S.C. 154(b) by 95 days.

(21) Appl. No.: 16/176,082

(22) Filed: Oct. 31, 2018

(51) Int. Cl.
| | |
|---|---|
| *G08G 1/09* | (2006.01) |
| *B64C 39/02* | (2006.01) |
| *G08G 1/01* | (2006.01) |
| *G08G 1/04* | (2006.01) |
| *G08G 1/07* | (2006.01) |
| *G08G 1/097* | (2006.01) |
| *G08G 1/017* | (2006.01) |

(52) U.S. Cl.
CPC ............ *G08G 1/091* (2013.01); *B64C 39/024* (2013.01); *G08G 1/012* (2013.01); *G08G 1/0125* (2013.01); *G08G 1/0141* (2013.01); *G08G 1/0175* (2013.01); *G08G 1/04* (2013.01); *G08G 1/07* (2013.01); *G08G 1/097* (2013.01); *B64C 2201/027* (2013.01); *B64C 2201/122* (2013.01); *B64C 2201/127* (2013.01)

(58) Field of Classification Search
CPC ...... G08G 19/091; G08G 1/0125; G08G 1/04; G08G 1/0141; G08G 1/097; G08G 1/0175; G08G 1/012; G08G 1/07; B64C 39/024; B64C 2201/122; B64C 2201/027; B64C 2201/127
See application file for complete search history.

(56) References Cited

U.S. PATENT DOCUMENTS

| | | | |
|---|---|---|---|
| 6,084,510 A | 7/2000 | Lemelson et al. | |
| 9,563,201 B1 * | 2/2017 | Tofte | G06F 3/0488 |
| 9,589,448 B1 | 3/2017 | Schneider et al. | |
| 9,646,495 B2 | 5/2017 | Barnet et al. | |
| 9,659,503 B2 | 5/2017 | Gordon et al. | |

(Continued)

FOREIGN PATENT DOCUMENTS

| | | |
|---|---|---|
| EP | 3118826 A1 | 1/2017 |
| KR | 20150111578 A | 12/2015 |

(Continued)

OTHER PUBLICATIONS

Drone Solution for Security & Surveillance, http://www.airobotics.co.il/security-and-emergency-response/.

(Continued)

*Primary Examiner* — Mary Cheung
(74) *Attorney, Agent, or Firm* — Law Office of Jeff Williams PLLC; J. Oliver Williams

(57) ABSTRACT

An unmanned aerial vehicle system for deployment at a scene includes an unmanned aerial vehicle, a command center, a communication suite, and a display. The unmanned aerial vehicle is configured to travel between two or more destinations. Command center is configured to monitor and regulate movement of the unmanned aerial vehicle in flight during deployment. The communication suite is transported within the unmanned aerial vehicle to permit the transfer of electronic data between itself and the command center. The display is mounted to the unmanned aerial vehicle and broadcasts information visually to observers near the scene. The command center can regulate the information broadcast on the display via the communication suite.

10 Claims, 3 Drawing Sheets

(56) References Cited

U.S. PATENT DOCUMENTS

| | | |
|---|---|---|
| 2004/0030571 A1 | 2/2004 | Solomon |
| 2004/0068415 A1 | 4/2004 | Solomon |
| 2015/0350914 A1 | 12/2015 | Baxley et al. |
| 2016/0116914 A1 | 4/2016 | Mucci |
| 2016/0139595 A1* | 5/2016 | Yang .................... G05D 1/0016 701/2 |
| 2016/0272317 A1* | 9/2016 | Cho .................... G05D 1/0088 |
| 2016/0275801 A1 | 9/2016 | Kopardekar |
| 2016/0328979 A1 | 11/2016 | Postrel |
| 2017/0113815 A1 | 4/2017 | James et al. |
| 2017/0134086 A1* | 5/2017 | Liu .................... H04B 7/18502 |
| 2017/0301220 A1* | 10/2017 | Jarrell .................... H04W 4/38 |

FOREIGN PATENT DOCUMENTS

| | | |
|---|---|---|
| WO | 2016174466 A2 | 11/2016 |
| WO | 2017029611 A1 | 2/2017 |
| WO | 2017065594 A1 | 4/2017 |

OTHER PUBLICATIONS

Franzen, Carl; The Loaded New DJI Phantom 3 Drone Can Shoot in 4K; Popular Mechanics; Apr. 8, 2015; http://www.popularmechanics.com/flight/drones/a14984/dji-phantom-3-drone-4k/.
Robotic Aerial Security, http://www.nightingalesecurity.com/.
Surveillance & Monitoring with UAVs, https://www.microdrones.com/en/applications/areas-of-application/monitoring/.

* cited by examiner

UNMANNED AERIAL VEHICLE FOR TRAFFIC MANAGEMENT AND SURVEILLANCE

BACKGROUND

1. Field of the Invention

The present application relates to an observation platform, and more particularly to a modular assembly used to provide an elevated platform to enhance user's ability to view their environment.

2. Description of Related Art

Unmanned aerial vehicles (UAVs) are aircraft with no on-board crew or passengers. They can be automated 'drones' or remotely piloted vehicles (RPVs). UAV's can fly for long periods of time at a controlled level of speed and height and have a role in many aspects of aviation. These have been around in use as early as the first world war and have been used in wars up to modern day. Conventionally these vehicles are commonly referred to as drones and their use and accessibility to everyday citizens have increased dramatically. Drones are often thought of as a relatively small flight operable aircraft that has similar capabilities to that of a helicopter. It can hover, rotate, fly in all directions, and carry small payloads. It is operated through remote control by a remote operator.

There are many uses for UAVs but in the personal electronic category, these are primarily for fun. It is used in surveying, mapping, photography, and many other areas. However, there are many areas of life where UAVs have not been explored in terms of usefulness. As most drone/UAV use is singular, a network of UAVs working together for traffic and surveillance has not been done.

Although strides have been made to provide unmanned aerial vehicles that are easily accessible and useful, shortcomings remain. It is desired that a system of UAVs be developed to permit coordinated and timely monitoring and regulating of traffic and emergency response from trained personnel.

SUMMARY OF THE INVENTION

It is an object of the present application to provide an unmanned aerial vehicle system that works with emergency personnel for the verification of emergency situations, traffic regulation, and general emergency response. The system is configured to provide a tool to local enforcement officers to more easily adapt to changing conditions and communicate more clearly with the public. The system includes one or more UAVs (unmanned aerial vehicles) that operate through a central command center. The UAVs may be deployed through the central command center or locally by officers.

It is a further object of the present application that the UAVs be equipped with means of communication for transmitting electronic data over a network to relay information to the command center. Additionally the UAVs may be equipped with means of communication for conveying information to the public at a specific scene. This information provided to the public can be used to alleviate congestion, provide direction, and in general help manage public relations to some degree at the scene. Ultimately the invention may take many embodiments. In these ways, the system overcomes the disadvantages inherent in the prior art.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
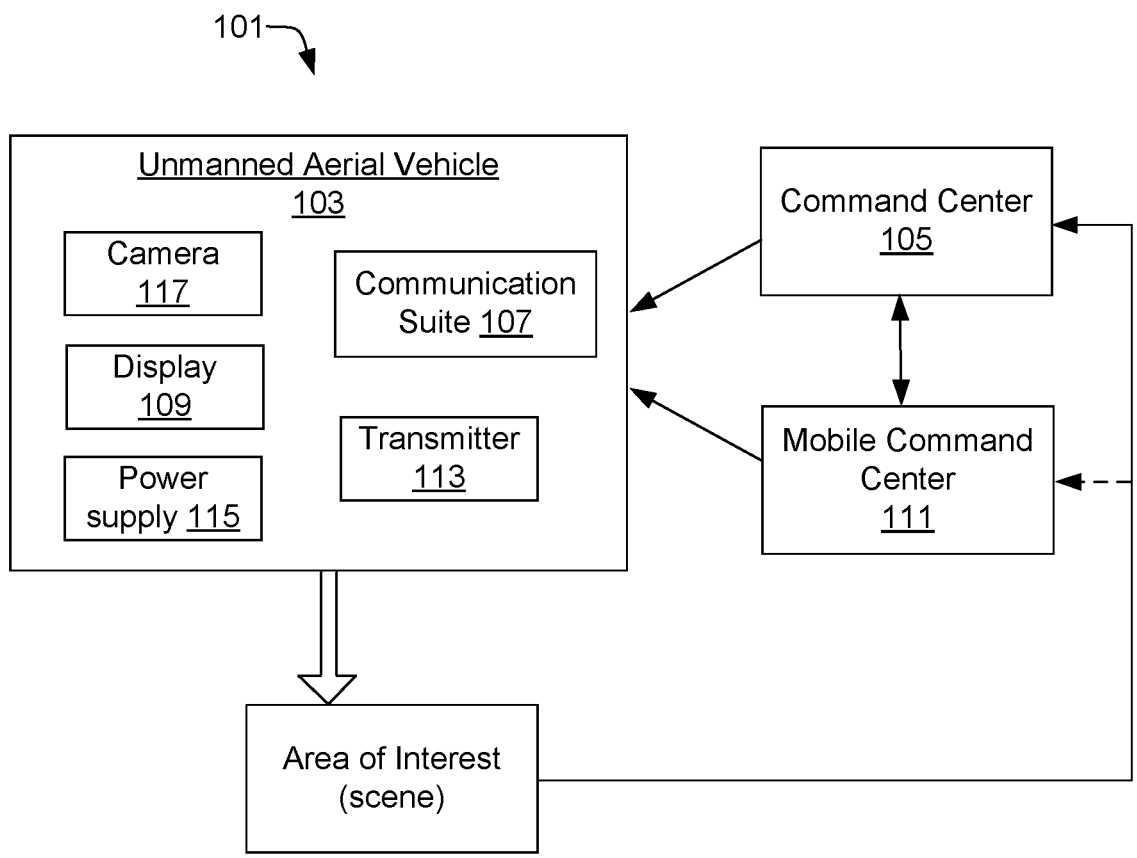
FIG. 1 is a representative chart of the unmanned aerial vehicle system according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The system in accordance with the present application overcomes one or more of the above-discussed problems commonly associated with conventional unmanned aerial vehicles and their uses discussed previously. In particular, the unmanned aerial vehicle system includes capability of operating one or more unmanned aerial vehicles remotely over a network for the purpose of traffic management and surveillance. The system is configured to be used with local emergency personnel for deployment at scenes to manage traffic congestion, communicate with the public, monitor traffic movements, and provide initial surveillance at a scene. Use of the system will aid in response times and in the proper deployment of emergency personnel in a manner that saves time, money, and resources to adequately address each situation. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. The system includes an unmanned aerial vehicle (UAV) configured to travel between destinations upon deployment. The UAV is controlled over a network or through direct link with a command center. The UAV includes a communication suite to facilitate communications and process captured information from the scene. A display is included and coupled to the UAV for the broadcasting of visual data to facilitate communication with observers at a scene. Additional features and functions of the device are illustrated and discussed below.

Referring now to the Figures wherein like reference characters identify corresponding or similar elements in form and function throughout the several views. The following Figures describe the system of the present application and its associated features. With reference now to the Figures, an embodiment of the system and method of use are herein described. It should be noted that the articles "a", "an", and "the", as used in this specification, include plural referents unless the content clearly dictates otherwise.

Referring now to FIG. 1 in the drawings, a chart of the unmanned aerial vehicle system 101 is illustrated. System 101 includes an unmanned aerial vehicle 103, a command center 105, a communication suite 107 coupled to vehicle 103, and a display 109. Unmanned aerial vehicle 103 is configured to travel between two or more destinations. Command center 105 is configured to monitor and regulate movement of the unmanned aerial vehicle 103 in flight during deployment. Communication suite 107 is transported within the unmanned aerial vehicle 103 to permit the transfer of electronic data between itself and the command center. Display 109 is mounted to the unmanned aerial vehicle 103 and broadcasts information visually to observers near the scene. The command center can regulate the information broadcast on the display via communication suite 107.

Unmanned aerial vehicle 103 is an aircraft that operates via remote control from command center 105. Vehicle 103 is configured to travel or between locations through the air and remain at a particular location for a particular task. Deployment can be from command center 105 or from a mobile command center 111. Mobile command center 111 is included within system 101 and can be associated with mobile emergency response personnel. Therefore, vehicle 103 may be deployed at any location an emergency response vehicle is at. To facilitate this, vehicle 103 is transportable and sized to travel within a car, truck, or response vehicle for on demand deployment. Alternatively, and in preferred situations, vehicle 103 is deployed from the command center 105 which may serve as a dispatch, police or fire station, or other headquarters for response personnel. A plurality of vehicles 103 may stand ready and able for deployment when necessary for any number of situations. When deployed from mobile command center 111, temporary control may rest with mobile command center 111 for the purposes of initiating flight and location but then may switch over to command center 105 for further activity.

Communication suite 107 is included to assist in the transmission and reception of command data from command center 105 and overall general electronic data that includes information for display and processing by personnel. Command center 105 is in direct communication with vehicle 103 and is piloted from center 105. A transmitter 113 is used to assist in the transmission of data. A power supply 115 is also included within vehicle 103 and is used to supply a steady source of power for operation of the various systems therein. Such systems include a camera 117 that is configured to capture both still photos and live recordings of the scene. Communication suite 107 is configured to receive the information from camera 117 and process the information. This information is sent to command center 105.

Additionally, suite 107 is configured to recognize and detect movement and behavior captured through camera 117. In other words, camera 117 is ideally suited for the monitoring of traffic, or vehicles, that interact in the area of interest (scene). Suite 107 can assess speed, direction, and location of vehicles and processes such information with known traffic rules such as speed limit, environmental conditions, and so forth, so as to detect possible traffic infractions. These traffic rules may be those commonly standard at the location or as governed through system 101 and conveyed to the public through display 109. When an infraction is potentially detected, suite 107 may send that to command center 105 for review prior to issuing a citation. Alternatively, suite 107 may also adjust the broadcasted message on display 109 to communicate to the public or a driver as a result of the potential infraction. For example, suite 107 may show a message to "slow down", "no right turns", "turn on lights", and so forth.

Display 109 is configured to include a screen that emits light for the viewing of the public. Many types of messages may be presented therein. These messages are predominantly controlled by centers 105 and 111 but may be automatically produced upon the detection of traffic behavior. A plurality of colors may be generated, such as green, red, and yellow similar to a traffic light. Any visual information may be broadcast to direct traffic or inform the public of a condition or warning.

Communication suite 107 also includes a location guidance capability that monitors the precise location of vehicle 103. The location may include coordinates, speed, direction, orientation, elevation, and so forth. This allows centers 105 or 111 to set a hovering location for which vehicle 103 is to remain while deployed. Both centers may also then monitor the location of vehicle 103 to permit correction of positioning. Vehicle 103 can travel to and from that location and automatically return to either center 105 or 111. As vehicle 103 has a limited range, topographical maps and surveys of cities may be stored within suite 107 to assist in properly navigating between destinations once deployed.

Figure 2:
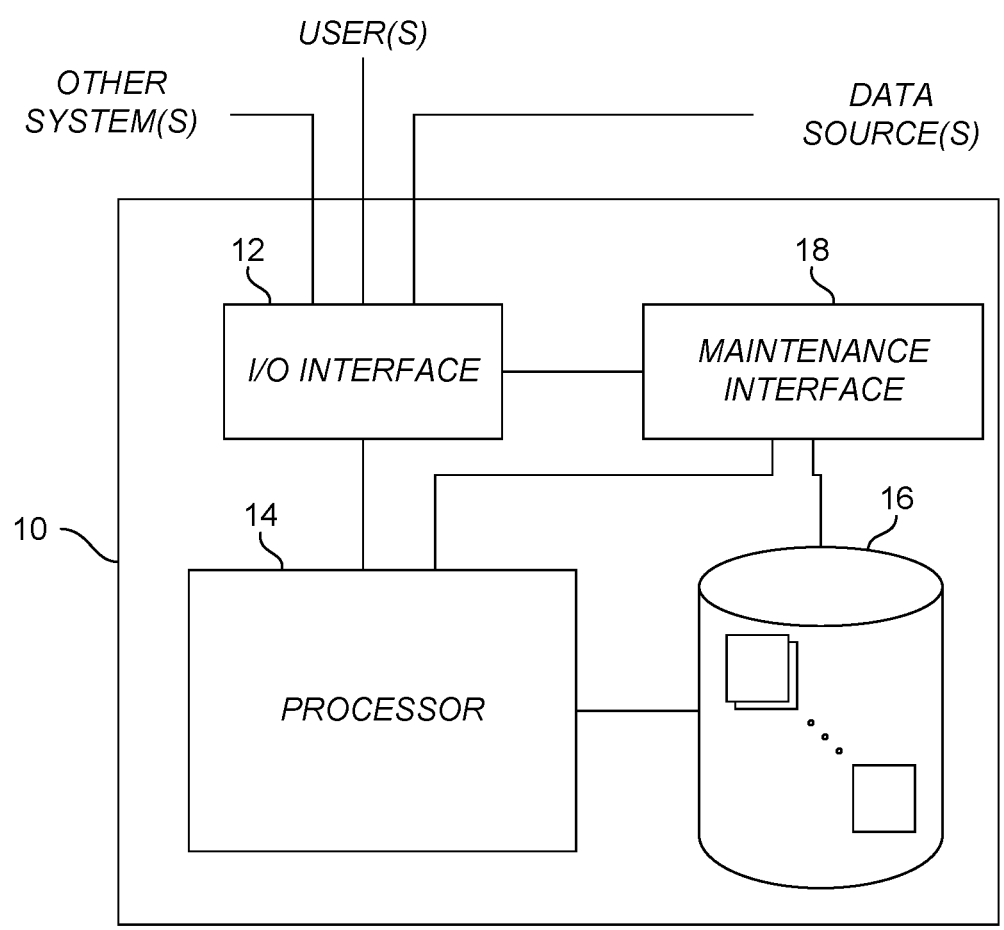
FIG. 2 is an exemplary schematic of electronic components used in the system for communicating between multiple users as seen in FIG. 1.

Referring now also to FIG. 2 in the drawings, a schematic of an exemplary computing system for use in vehicle 103 is illustrated. As stated previously, the functions and features of both vehicle 103 is to travel between destinations, provide assistance to emergency personnel regarding the public, and for surveillance. FIG. 2 illustrates an exemplary set of components used to facilitate its purposes as a vehicle 103. This may include the transmission/reception of data, the processing and analysis of such data, and the ability to permit remote control of vehicle 103 through suite 107. The system described in FIG. 2 can represent any portion of the electronics used within system 101.

The computing system 10 includes an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of the computing system 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the computing system 10. The I/O interface 12 can be configured for allowing one or more users to input information to the computing system 10 via any known input device. Examples can include a keyboard, mouse, touch screen, microphone, and/or any other desired input device. The I/O interface 12 can be configured for allowing one or more users to receive information output from the computing system 10 via any known output device. Examples can include a display monitor, a printer, a speaker, and/or any other desired output device. The I/O interface 12 can be configured for allowing other systems to communicate with the computing system 10. For example, the I/O interface 12 can allow one or more remote computer(s) to access information, input information, and/or remotely instruct the computing system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the computing system 10 to perform one or more of the tasks described herein.

The database 16 provides persistent data storage for computing system 10. While the term "database" is primarily used, a memory or other suitable data storage arrangement may provide the functionality of the database 16. In alternative embodiments, the database 16 can be integral to or separate from the computing system 10 and can operate on one or more computers. The database 16 preferably provides non-volatile data storage for any information suitable to support the operation of the computing system 10, including various types of data discussed below.

The maintenance interface 18 is configured to allow users to maintain desired operation of the computing system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, linking multiple devices, and/or performing data backup operations. In some embodiments, the maintenance interface 18 can be configured to allow for maintenance of the processor 14 and/or the I/O interface 12. This can include, for example, software updates and/or administrative tasks such as security management and/or adjustment of certain tolerance settings.

The processor 14 is configured receive communication data from one or more sources and process that data according to one or more user parameters. Examples of parameters could be limitations, warnings, time related functions, spatial restrictions such as location limitations, and so forth. The processor 14 can include various combinations of one or more computing systems, memories, and software components to accomplish these tasks and functions.

Figure 3:
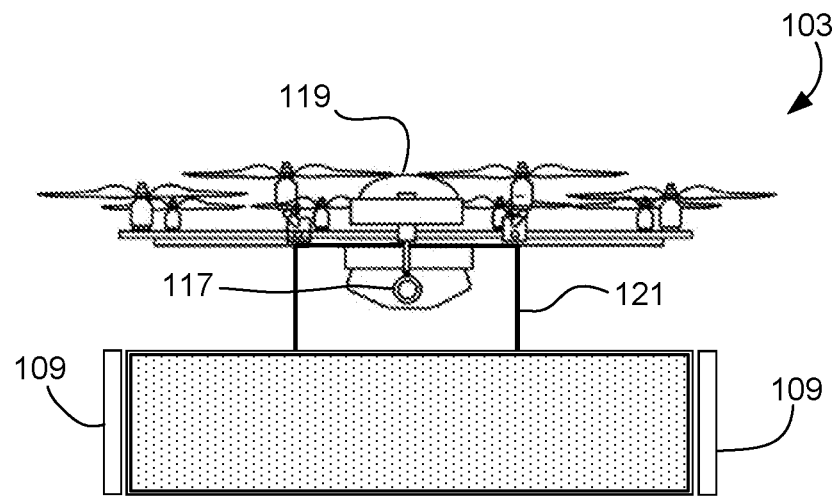
FIG. 3 is a side view of a representative unmanned aerial vehicle in the unmanned aerial vehicle system of FIG. 1.
Figure 4:
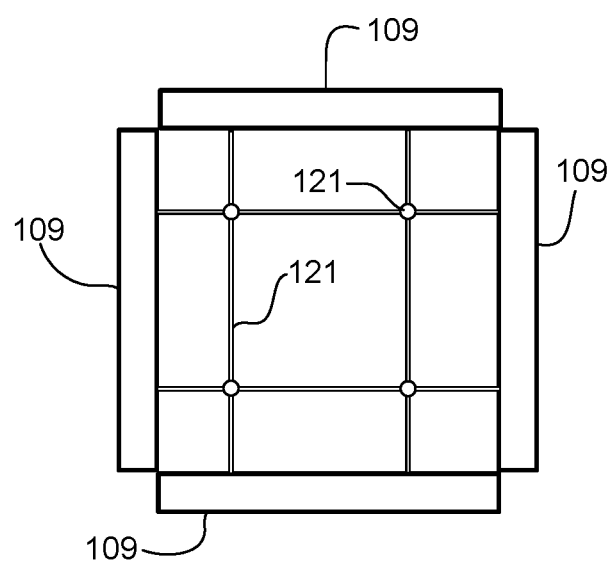
FIG. 4 is a top view of displays in the unmanned aerial vehicle of FIG. 3.

Referring now to FIGS. 3 and 4 in the drawings, a representative example of unmanned aerial vehicle system 101 is illustrated. In particular, vehicle 103 is shown. As seen, vehicle 103 is an airworthy aircraft similar to a drone. One or more propellers may be used to instigate flight. A central hub 119 is shown centrally located within the propellers that can be used to house camera 117, suite 107, transmitter 113, and power supply 115. Display 109 is suspended below the propellers and hub 119. As seen in the Figures, more than one display 109 is shown. Vehicle 103 may include two or more displays to more easily facilitate the broadcasting of information. For example, by having four displays 119, vehicle 103 may rest in the middle of an intersection and direct traffic for all directions of traffic if the signals were out. Displays are mounted to support structure 121. FIG. 4 shows support structure 121 more clearly by removing the done itself. Camera 117 may be located above or below displays 109 and is not limited in its orientation. Camera 117 may rotate freely or swivel 360 degrees to permit observation without needing to change the orientation of vehicle 103 as a whole.

Some ideal uses for system 101 have been expressed. Additional uses are as follows: An accident may be called into the police as occurring on a roadway. Initial reports are used to assess the type of emergency personnel to dispatch. At times these reports are not adequate as the people at the scene are not trained. This leaves a situation where either too many emergency personnel are dispatched, resulting in a waste of resources, time, and money; or not enough resources are dispatched, resulting in inadequate resources, longer delays, and so forth to address the needs at the scene. In situations as this, dispatch can deploy a vehicle 103 quickly to the scene from centers 105 or 111 which can take live video of the accident. This can be sent to centers 105 or 111 for review prior to dispatching emergency personnel.

Another situation was discussed briefly before of monitoring traffic behavior. A condition may arise where an accident occurs and traffic backs up. Centers 105 or 111 may deploy vehicle 103 to the scene to broadcast a message to drivers as to the condition ahead and recommend a different route. By informing drivers of the situation ahead, they may more quickly seek an alternate route and avoid the long delays. Furthermore, when vehicle 103 is guiding traffic either at an intersection or along a roadway, it may modify traffic regulations such as speed or a closure of a lane. Where infractions are determined, such potential infraction may be transmitted to either center 105 or 111 for review.

Likewise, vehicle 103 may be dispatched to motor vehicle accidents to display a signal to the public to stay off a lane in order to designate that lane to emergency vehicles use only. The purpose of such method is to help those emergency vehicles cut down the response time to these motor vehicle accidents, during which traffic jams would extend the response time to badly injured victims. The use of such method would ultimately decrease the response time of these emergency vehicles which could save more lives It is understood that the above circumstances illustrating possible uses of system 101 are not exhaustive. System 101 may be used in any emergency response situation as necessary to permit proper communication with the public and to aid in the overall response quality of emergency personnel. Additionally, more than one vehicle 103 may be used together in order to cover and handle a larger area. With respect to the camera 117, the precise location is not limited to that depicted. Camera 117 may be located above or below display 109 and may include functions such as zoom, infrared vision, thermal imaging, 360 degree view and so forth.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An unmanned aerial vehicle system for deployment at a scene, comprising:
    an unmanned aerial vehicle configured to travel between two or more destinations;
    a command center configured to monitor and regulate movement of the unmanned aerial vehicle;
    a communication suite transported within the unmanned aerial vehicle to permit the transfer of electronic data to the command center, the communication suite also configured to receive electronic data from the command center; and
    a display mounted to the unmanned aerial vehicle, the display configured to broadcast information visually to observers near the scene, the display being in communication with the communication suite to permit the command center to regulate the information broadcast on the display;
    wherein the communication suite can assess environmental conditions via a camera, the communication suite compares traffic behavior in view of the environmental conditions with local laws to identify and flag potential infractions, the infraction being transmitted for review, the communication suite configured to selectively issue a citation.

2. The system of claim 1, wherein the unmanned aerial vehicle includes a second display.

3. The system of claim 1, wherein the unmanned aerial vehicle is dispatched to the scene from the command center.

4. The system of claim 1, further comprising:
    a mobile command center in communication with the command center, the mobile command center configured to have temporary control of the unmanned aerial vehicle via link with the communication suite.

5. The system of claim 4, wherein the unmanned aerial vehicle is deployed to the scene via the mobile command center.

6. The system of claim 1, wherein the communication suite is configured to monitor the location of the unmanned aerial vehicle so as to position itself in the air.

7. The system of claim 1, wherein the display is configured to broadcast visual information configured to direct traffic.

8. The system of claim 1, wherein the display can display a plurality of colors.

9. The system of claim 1, wherein the camera is configured to take still photos and video.

10. The system of claim 9, wherein the communication suite is configured to track vehicle movements at the scene through the camera.

\* \* \* \* \*